(12) United States Patent
Kamenev (10) Patent No.: US 11,761,753 B2
(45) Date of Patent: Sep. 19, 2023

(54) THIN FILMS AND SURFACE TOPOGRAPHY MEASUREMENT USING POLARIZATION RESOLVED INTERFEROMETRY

(71) Applicant: Svarog LLC, Beaverton, OR (US)

(72) Inventor: Boris V. Kamenev, Beaverton, OR (US)

(73) Assignee: Svarog LLC, Beaverton, OR (US)

( * ) Notice: Subject to any disclaimer, the term of this patent is extended or adjusted under 35 U.S.C. 154(b) by 136 days.

(21) Appl. No.: 17/390,470

(22) Filed: Jul. 30, 2021

(65) Prior Publication Data

US 2023/0035415 A1 Feb. 2, 2023

(51) Int. Cl.
G01B 11/06 (2006.01)
G01B 9/02 (2022.01)
G01B 9/0209 (2022.01)
G01B 11/24 (2006.01)

(52) U.S. Cl.
CPC ........ G01B 11/0675 (2013.01); G01B 9/0209 (2013.01); G01B 9/02043 (2013.01); G01B 11/2441 (2013.01); G01B 2290/70 (2013.01)

(58) Field of Classification Search
CPC .............. G01B 9/0209; G01B 11/0675; G01B 11/2441; G01B 2290/70; G01B 2290/45
See application file for complete search history.

(56) References Cited

U.S. PATENT DOCUMENTS

| 5,398,113 | A | 3/1995 | De Groot |
| 7,324,210 | B2 | 1/2008 | De Groot et al. |
| 7,428,057 | B2 | 9/2008 | De Lega et al. |
| 8,126,677 | B2 | 2/2012 | De Groot et al. |
| 8,818,754 | B2 | 8/2014 | Kamenev et al. |
| 9,880,377 | B1 * | 1/2018 | Safrani ............. G02B 21/22 |

(Continued)

FOREIGN PATENT DOCUMENTS

| EP | 1604169 A2 * | 12/2005 | ......... G01B 11/0608 |
| WO | WO-9214115 A1 * | 8/1992 | ........... G01B 11/162 |

OTHER PUBLICATIONS

De Lega, X. Colonna et al. "Multi-purpose optical profiler for characterization of materials, film stacks and for absolute topography measurement". Metrology, Inspection, and Process Control for Microlithography XXIII, Proc. of SPIE vol. 7272, Mar. 23, 2009. (Year: 2009).*

(Continued)

*Primary Examiner* — Michael A Lyons
(74) *Attorney, Agent, or Firm* — Klarquist Sparkman, LLP (57) ABSTRACT

Apparatus include a polarization state generator situated to provide an interferometer source beam with a region of polarized source light with a polarization state that is in-plane as subsequently incident on a sample and a region of polarized source light with a polarization state that is perpendicular to in-plane as subsequently incident on the sample, and an interferometer unit configured to split the interferometer source beam into test and reference arm beams, to direct the test arm beam to the sample and the reference arm beam to a reference surface, and to recombine the test and reference arm beams to produce an interferometer output beam. Methods use a polarization state generator to produce an interferometer source beam and use an interferometer unit which splits the interferometer source beam into test and reference arm beams.

22 Claims, 5 Drawing Sheets

(56) References Cited

U.S. PATENT DOCUMENTS

| | | |
|---|---|---|
| 2006/0158658 A1 | 7/2006 | Colonna De Lega et al. |
| 2012/0224183 A1 | 9/2012 | Fay et al. |
| 2013/0010283 A1* | 1/2013 | Villiger .................. G01J 3/453 |
| | | 250/550 |
| 2019/0170655 A1* | 6/2019 | Smith .............. G01N 21/95607 |
| 2020/0209155 A1* | 7/2020 | Kim .................. G01N 21/8422 |

OTHER PUBLICATIONS

Jiang et al., "Fast surface measurement using wavelength scanning interferometry with compensation of environmental noise," *Applied Optics*, 49(15):2903-2909 (May 20, 2010).

Moschetti et al., "Quadrature Wavelength Scanning Interferometry," *Applied Optics*, 9 pages (Jun. 13, 2016).

\* cited by examiner

THIN FILMS AND SURFACE TOPOGRAPHY MEASUREMENT USING POLARIZATION RESOLVED INTERFEROMETRY

FIELD

The disclosure pertains to interferometry, ellipsometry, and imaging.

BACKGROUND

In the past, linearly polarized illumination light has been used to allow the obtaining of angularly resolved information in a pupil plane, with polarization state determined by azimuth angle of the pupil. To avoid a mix of the entire test sample area into pupil plane, De Lega et al. (U.S. Pat. No. 7,428,057) inserted a small field stop (f-stop) in the illumination path to limit analyzed area within test sample. The system can be switched between two modes by replacing a zoom lens and f-stop, providing either topography measurement or ellipsometry measurement. However, this technique suffers from inconsistency (e.g., different measurements are required to evaluate film properties and topography), is limited to relatively small uniform area in ellipsometry mode, and requires complicated system calibration to properly correct phase error in topography measurement mode.

An extension of this technique disclosed in U.S. Pat. No. 8,126,677 keeps only a topography mode of operation in the measurement, and ellipsometry results are replaced with a pre-generated library of model signals that covers expected variation of optical parameters of the test sample. The measured signal is than compared to each of the library entries to find a best match and evaluate both topography and optical parameters (e.g., film thickness, refractive index, extinction coefficient, etc.) for each region of the test sample. However, the approach is computationally intense even with use of advanced processing techniques, and still suffers from model idealization that requires sophisticated calibration techniques. Accordingly, a need remains for improved systems and methods.

SUMMARY

According to an aspect of the disclosed technology, apparatus include a polarization state generator situated to provide an interferometer source beam with a region of polarized source light with a polarization state that is in-plane as subsequently incident on a sample and a region of polarized source light with a polarization state that is perpendicular to in-plane as subsequently incident on the sample, and an interferometer unit configured to split the interferometer source beam into test and reference arm beams, to direct the test arm beam to the sample and the reference arm beam to a reference surface, and to recombine the test and reference arm beams to produce an interferometer output beam. In some examples, the polarization state generator is configured to provide (i) the region of polarized source light with the polarization state that is in-plane as subsequently incident on the sample as a region of radially aligned linear polarization state and (ii) the region of polarized source light with the polarization state that is perpendicular to in-plane as subsequently incident on the sample as a region of azimuthally aligned linear polarization state. Some polarization state generator include an S-waveplate or a vortex polarizer situated at a source beam pupil plane. Some polarization state generators include a linear polarizer configured to provide the interferometer source beam with a linear polarization state, a half-waveplate configured to rotate a portion of the linearly polarized interferometer source beam to provide beam portions that are linearly polarized and perpendicular to each other as incident to the S-waveplate or vortex polarizer. Some polarization state generators include a micropolarizer array comprising a plurality of polarizing cells. In some examples, the interferometer source beam comprises a ring or ring segmented beam spatially filtered or as generated from a beam source. Some examples include an illumination light source configured to provide a source beam to the polarization state generator, wherein the illumination light source is further configured to vary a wavelength of the source beam to produce an optical path difference for wavelength scanning interferometry. In some examples, the interferometer unit comprises a movement stage configured to vary an optical path difference between the test and reference arms for displacement scanning interferometry. Some examples include a detection unit configured to detect the interferometer output beam, wherein the detection unit includes a polarization filter situated at a detection pupil plane to receive at least a portion of the interferometer output beam and to attenuate one of the polarization states provided by the polarization state generator. In some examples, the detection unit includes a beam splitter configured to split the interferometer output beam into first and second beam portions, a first detection arm including the polarization filter situated to receive the first beam portion and including a first detector situated to receive the filtered first beam portion, and a second detection arm including a second detector situated to detect the second beam portion. In some examples, the second detection arm includes a second polarization filter situated to receive the second beam portion at a second detection arm pupil plane, wherein the second polarization filter is configured to attenuate the other of the polarization states provided by the polarization state generator, wherein the second detector is situated to receive the second beam portion as a filtered second beam portion. In some examples, the first detector and second detector are situated at respective sample imaging planes to detect images of the sample. In some examples, the second arm comprises a field stop situated at a sample imaging plane and wherein the field stop is configured to limit a sample detection area at the second detector, wherein the second detector is situated at a pupil plane of the second arm to detect the second beam portion. In some examples, the first detector and second detector are configured to simultaneously detect imaging information and ellipsometric pupil information, respectively. Some examples include a processor and memory, wherein the memory is configured with processor-executable instructions that cause the processor to compare first and second interferogram images to determine material properties of the sample and/or determine ellipsometric information of the sample from one or more collected pupil plane images. In some examples, the region of polarized source light with a polarization state that is in-plane as subsequently incident on a sample and the region of polarized source light with a polarization state that is perpendicular to in-plane as subsequently incident on the sample form a common region having a superposition of two orthogonal linear polarizations. Some interferometer units can include a Linnik, Michelson, and/or Mach-Zehnder interferometer configured to produce an interferometer output beam.

According to another aspect of the disclosed technology, methods include using a polarization state generator, producing an interferometer source beam with a region of polarized source light with a polarization state that is in-plane as subsequently incident on a sample and a region of polarized source light with a polarization state that is perpendicular to in-plane as subsequently incident on the sample, and using an interferometer unit, splitting the interferometer source beam into test and reference arm beams, directing the test arm beam to the sample and the reference arm beam to a reference surface, and recombining the test and reference arm beams to produce an interferometer output beam. Some examples further include directing at least a portion of the interferometer output beam through a first detection channel to collect a first interferogram image of the test sample, including by filtering the portion of the beam to select one of the polarization states produced for the interferometer source beam. Some examples further include directing a separate portion of the interferometer output beam through a second detection channel to collect a second interferogram image of the test sample, including by filtering the portion of the beam to select the other of the polarization states produced for the interferometer source beam. Some examples further include comparing the first and second interferogram images with a processor to determine material properties of the test sample. Some examples further include directing a portion of the interferometer output beam through a detection channel to collect a pupil plane image associated with the test sample. Some examples further include, with a processor, determining ellipsometric information of the test sample from the collected pupil plane image.

According to a further aspect of the disclosed technology, methods include arranging a polarization state generator in an imaging apparatus to provide an interferometer source beam with a region of polarized source light with a polarization state that is in-plane as subsequently incident on a sample and a region of polarized source light with a polarization state that is perpendicular to in-plane as subsequently incident on the sample, and arranging an interferometer unit in the imaging apparatus, wherein the interferometer unit is configured to split the interferometer source beam into test and reference arm beams, to direct the test arm beam to the sample and the reference arm beam to a reference surface, and to recombine the test and reference arm beams to produce an interferometer output beam.

The foregoing and other objects, features, and advantages of the disclosed technology will become more apparent from the following detailed description, which proceeds with reference to the accompanying figures.

DETAILED DESCRIPTION

Introduction

Interferometry techniques are widely used to evaluate topography of a test structure. An electromagnetic wave from a common source is split using a beam splitter into a test channel and a reference channel. Rays reflected from test sample structure is then combined with rays reflected from a reference structure having known properties in order to produce an interference signal. The resulting interference signal is generally a function of an optical path difference (OPD), the wavelength of interacting electromagnetic waves, and optical properties of test and reference structures.

Interferometry techniques also can be incorporated into an optical microscope. For example, a standard optical microscope can image a small area of a test sample onto a detector area of a sensor, with some magnification. As result, each pixel of the area detector can be associated with or represent a certain area of the test sample. Common illumination light used for illuminating the test sample in the standard optical microscope can be split along test and reference channels, and subsequently recombined, thereby providing interferometry capabilities to the standard optical microscope. Example interferometer arrangements and implementations that can be inserted into the optical microscope can include Mirau, Linnik, Michaelson, etc.

An interferogram can be obtained by changing the OPD in various ways, such as by varying a length of either signal or reference arm or by varying illumination light wavelength. The interferogram that is formed can be detected and include a set of frames corresponding to different OPD position or different wavelength.

In some disclosed examples, one OPD scanning approach that can be used can be referred to as scanning white light interferometry (SWLI), in which a broadband light source is used as an illumination source. Because coherence length of broadband light sources is typically small, the typical signal includes a few fringes localized near optical zero OPD. Analysis of the signal can involve transformation of the signal to a frequency domain using, for example, Fourier transform, and the rate of change of phase with wavelength can be calculated.

Some examples can use a wavelength scanning interferometry (WSI) technique which, in contrast to SWLI techniques, uses a fixed non-zero OPD and varies (scans) the wavelength of the interacting electromagnetic waves. Bandwidth of each electromagnetic wave is sufficiently narrow to ensure a coherence length greater than the optical path difference so as to have sufficient fringe contrast. The principal advantage of WSI over SWLI is that with WSI, mechanical scanning of the sample is unnecessary due to the long coherence length of the illumination, which translates to lower sensitivity to environment vibrations. As wavelength changes using WSI, the interferometric signal follows a sinusoidal function with frequency and phase determined by OPD. The value of OPD then can be evaluated by extracting frequency or from phase dispersion of the obtained interferogram.

In many examples, a relative OPD is of practical interest. For example, an OPD difference between different camera pixels of the sensor can represent a height variation of a characterized test sample. In such a case, in addition to the methods described above, a phase difference between interferograms at different camera pixels can be used to evaluate relative height difference.

In many applications, regardless of interferometry technique, it can be difficult to obtain accurate estimates of test sample topography as properties of reflected light can be dependent on surface composition of the test sample. Magnitude, phase, and polarization state of reflected light is a function of material, presence of thin films, periodic structures, etc. The resulting interferogram can be subject to an error, generally referred to as a phase change on reflection (PCOR), which is corrected in order to obtain accurate estimates.

Common techniques for evaluating intrinsic properties of a test structure, such as material, film thickness, etc., include ellipsometry and reflectometry, where complex reflectivity of the light reflected from or transmitted through the test sample is analyzed to evaluate optical properties of the test structures. Generally, these techniques can require a separate metrology system which can complicate test sample logistics. Further, the separate metrology system does not fully address the problem of topography error correction as the measurement system itself also introduces an error. Therefore, calibration of such dual system techniques is problematic.

In disclosed examples, an ellipsometer and interferometric microscope are combined within a single measurement system. Systems can be configured to image a microscope objective pupil to area detector allowing an angularly resolved inerferometric signal to be obtained from a test sample. In some examples, the interferometric microscope can be configured to have more than one operating mode. For example, a first mode can correspond to a standard imaging mode where a test sample is imaged on an area detector (e.g., different elements of the detector correspond to different locations of the test surface). In a second operating mode, the system can be configured to image objective pupil to the area detector, providing angular resolved information of light reflected from test surface.

Modes can be operated and configured in different ways. In some examples, modes can be provided with different detection arms configured in a fixed manner, such as one or more arms imaging sample area only or pupil area only, which can also enable simultaneous detection. In further examples, modes can be provided with one or more detection arms being reconfigurable with selective insertion or adjustment of lenses or aperture stops to alternate between sample and pupil imaging. In some examples, a single detection arm can be configured for sample and/or pupil imaging and can include an adjustable optical filter to selective attenuate different regions of received light, such as regions of radially polarized or azimuthally polarized light. In further examples, two arms are configured to sample imaging and one of the two arms is configured to pupil imaging. In a further example, three arms are present with two for sample imaging and one for pupil imaging. In a further example, four arms are present with two for sample imaging and two for pupil imaging.

In representative examples of the disclosed technology, imaging systems can include (i) an interferometer configured to combine electromagnetic wave reflected from test sample with electromagnetic wave reflected from a reference where test and reference waves comes from same source; (ii) tunable wavelength light source that can change output wavelength to produce interferogram; (iii) polarization mask which produces a set of polarization states for test and reference incident light to be either in-plane (p-polarization) of incidence or orthogonal (s-polarization) to the plane of incidence; (iv) an optical system that splits a combined interferometry signal into two channels equipped with respective optical detectors, where one channel is configured with a mask allowing only p-polarized light reflected from test sample reaching the detector while the other channel is configured with a mask allowing only s-polarized light reflected from the test sample to reach the detector; and (v) one or more electronic processors coupled to the optical detectors where electronic processors are configured to process information about the test sample.

In some examples, the information received the electronic processor or processors is based on two independent channels, such as two channels in any of the previous described examples, where information on one channel consists of an interferometric signal obtained with reflection of a p-polarized signal and information on the second channel consists of an interferometric signal obtained with reflection of s-polarized signal. In some examples, the measurement can provide independent topographic and ellipsometric information about the test sample.

In representative examples of the disclosed technology, method and apparatus can provide for simultaneous measurement of test sample topography (interferometric microscopy) and ellipsometry for every pixel on an area detector that corresponds to different locations of the test sample. That is, measurements can be taken over a complete detector area, e.g., without an additional mask or system stop limiting the detection area to a selected portion of the test sample. The apparatus can include a standard optical microscope configured in bright field illumination (e.g., with Kohler illumination) and can include a reference channel creating an interferometric unit or cell to obtain interference between a test sample and a reference mirror that is part of the reference channel. An imaging portion of the microscope can include a beamsplitter that splits light to be detected (e.g., after interference through the interferometer cell) onto two detection/registration channels.

Polarization of the illuminating light coming to an entrance pupil of an objective can be spatially set using polarization state generator, e.g., with a specially configured polarization mask, such that only s-polarized and/or p-polarized light is incident to the test sample. The pupil plane can correspond to a plane containing spatially resolved angular information, in which ray types are spread out across the beam cross-section, such as with a Fourier transform plane. For example, some illumination cross-sectional areas at the objective pupil plane are set to provide s-polarized rays incident to the test sample while other areas of objective pupil plane provide p-polarized rays incident to the test sample. Each ray reflected from test sample light is maintains an s- or p-polarization state, i.e., without an elliptical component, and its magnitude and phase are altered by test sample optical properties described with Fresnel equations.

In selected examples, the light that is reflected from the test sample interferes with reference light producing interferogram having phase and magnitude determined by optical properties of the test sample. The interference signal is then split onto two detection/registration channels where each channel is configured with a mask or other optical filter allowing either s-polarized or p-polarized areas of the objective pupil to be passed to detector. Configuring one of the channels to pass only s-polarized areas and the other channel to pass only p-polarized areas allows topography images of the test sample to be obtained for both s- and p-polarized light independently, and typically simultaneously. Analysis of the difference between of s- and p-interferograms can be used to eliminate height variation across a test sample, leaving only information about optical properties of the test sample. After the optical properties of the test sample are determined, the height error can be modeled and topography interferograms (either s- or p- or both) are properly analyzed.

Discussion of Working Examples

Figure 1:
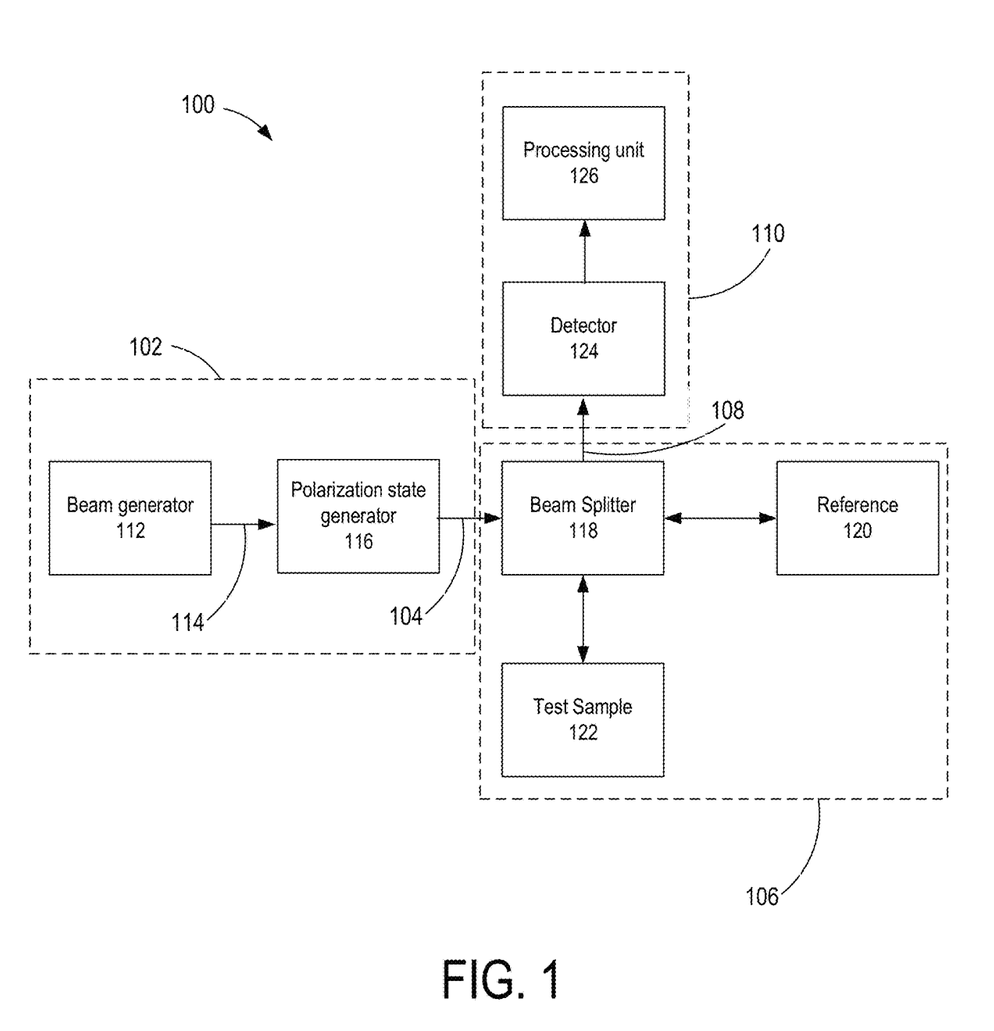
FIG. 1 is a schematic of an imaging apparatus configured to interferometrically image a test sample.

FIG. 1 is an interferometric ellipsometer microscope 100 that includes an illumination unit 102 configured to produce an illumination source beam 104, an interferometer unit 106 configured to produce an interferometer output beam 108, and a detection unit 110 configured to detect at least a portion of the interferometer output beam 108. The illumination unit 102 typically includes an illumination beam source 112 configured to produce source beam light 114. A polarization state generator 116 is situated to receive the source beam light 114 and to produce the illumination source beam 104 with a predetermined polarization state configuration. A beam splitter 118 of the interferometer unit 106 receives the illumination source beam 104 and splits the beam to direct a portion to a reference surface 120 and a portion to a test sample 122. The light portions are reflected by the respective reference surface and sample 120, 122 and recombined at the beam splitter 118 to form the interferometer output beam 108.

The predetermined polarization state configuration of the illumination source beam 104 is configured such that the polarization state of any portion of the light incident on the test sample 122 is in-plane or perpendicular to the plane of incidence. For example, optics such an objective lens can cause the portion of light to converge towards the surface of the test sample, and planes of incidence can be defined by an optical axis of the portion of light that directed to the test sample 122 and each convergent ray. Thus, in some examples, the polarization state generator 116 can be configured to provide the predetermined polarization state configuration of the illumination source beam 104 to be linearly polarized aligned radially or azimuthally in different cross-sectional regions. In some examples, one or more regions can include a superposition of radially-aligned and azimuthally-aligned linear polarization states. Example components of the polarization state generator 116 can include S-waveplates, vortex polarizers, or micropolarizer arrays.

The interferometer output beam 108 is received by the detection unit 110, which can have various configurations. In general, the detection unit 110 includes at least one detector 124. In many examples, the interferometer output beam 108 is split with one or more beam splitters to form multiple detection or registration channels having respective detectors. Different detection channels can be configured to detect different sample information, such as sample images or pupil images. Detection channels configured to image pupil information can include a mask to limit detected areas of the test sample 122. Detection channels can be configured with optical filters to attenuate or remove light having a selected polarization state, such as all light that is linearly polarized in-plane or all light that is linearly polarized perpendicular to in-plane at the test sample 122. Example filters can include components to the polarization state generator 116, such as S-waveplate, vortex polarizers, or micropolarizer array. In some example systems, a processor 126 can be coupled to receive detection signals from the detector 124 to produce interferometric images and/or provide interferometric analysis. An additional benefit of some disclosed examples is a larger field of view can be applied to the test sample, e.g., without the presence of a field stop reducer in the illumination unit 102, allowing fewer measurements of the test sample. The ability to use of the larger FOV is allowed by the control over the polarization state of the light that is incident on the test sample as provided by the polarization state generator 116, avoiding the incidence of elliptical polarization states on the test sample 122.

Figure 2:
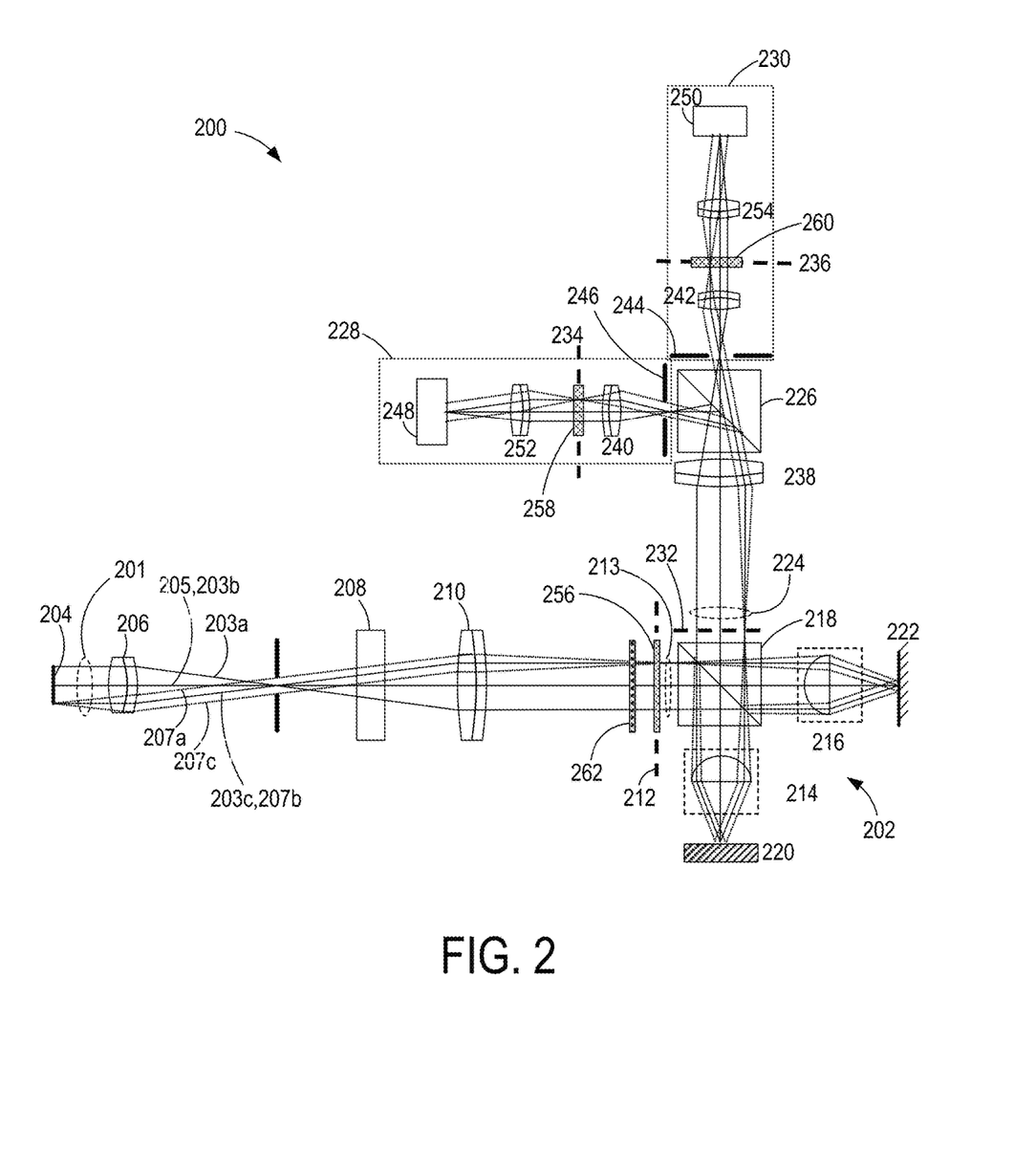
FIG. 2 is a schematic of another imaging apparatus and includes a trace of example rays propagating through the optical system

FIG. 2 is an example interferometric microscope system 200 using a Linnik type interferometer unit 202 and wavelength scanning interferometry (WSI) to produce a changing interferometric signal. Illumination light 201 generated by an extended light source 204 is collimated by lens 206. A set of rays 203a, 203b, 203c traces through the system 200 from a center position of a test sample 220 to the light source 204 as well as other components of the system 200, with ray 203b aligned with an optical axis 205 of the system 200 and with rays 203a, 203c tracing paths at opposite angles emitted from the center position of the test sample 200. Various intersections of the rays 203a, 203c with the optical axis 205 can correspond to conjugate image planes of the test sample 220. A set of rays 207a, 207b, 207c is also traced through the system 200, with the ray 207b corresponding to the off-axis ray 203c, and rays 207a, 207c emitted at opposite angles from the ray 207b. A tunable wavelength filter 208 can be situated to receive the light and to select a narrow band spectral component. In further examples, the light source 204 can be configured to tunably vary the wavelength of the generated light. However, it will be appreciated that the system 200 can use other techniques and is not limited to WSI only. For example, SWLI or any other interferometer implementation can be used in various examples. In such examples, the interferometer unit 202 can include a movement stage coupled to move or displace one or more components to vary an optical path difference, e.g., by varying a propagation length along a test sample or reference arm of the interferometer unit 202.

A lens 210 is situated to receive the light, e.g., at a distance of the combined focal lengths of the lenses 206, 210 from the lens 206 along an optical axis 201 of the generated illumination light. The illumination light 201 as generated by the light source 204 is then re-imaged by lens 210 to a pupil plane 212 of two objectives 214, 216, which can be identical or nearly identical in many examples. The pupil plane 212 can correspond to a back focal plane of the objective 214 and/or objective 216. An interferometer source beam 213 is formed that is received by the interferometer unit 202. The objectives 214, 216 together with a beamsplitter 218 can form an interferometric cell of the interferometer unit 202 where objective 214 collects light reflected from the test sample 220 and objective 216 collects light from a reference mirror 222. Reflected test and reference rays are combined on the beamsplitter 218 producing an interference signal in an interferometer output beam 224 that further propagates toward beamsplitter 226. The beam splitter 226 splits the interferometer output beam 224 to propagate along two channels 228, 230, which can be identical in some examples. As shown, the light from the light source 204 which is imaged previously on plane 212 is re-imaged on a plane 232. The plane 232 is then again imaged to planes 234, 236 with lens relay 238, 240 and lens relay 238, 242, respectively. Lens 238 forms another two optical relays with objective 214 and with objective 216, to project a magnified image of the sample 220 (combined with reference 222) onto a plane 244 and a plane 246. The images at the planes 246, 244 can be further projected to respective area detectors 248, 250 (e.g., a CCD or CMOS camera) using optical relay 240, 252 and optical relay 242, 254, respectively.

As shown, two identical interferometric images of the test sample are provided at the detectors 248, 250. However, as described herein, multiple different detection configurations are possible, including a single arm, more than two arms, or different images to be detected along arms. Also, as shown several planes 212, 232, 234, 236 are produced that are conjugated with the extended light source 204. In other words, the light source 204 can be imaged on any of planes 212, 232, 234, 236. The planes 234, 236 belong to different imaging channels while plane 212 is a common source plane for both imaging channels.

Figure 3:
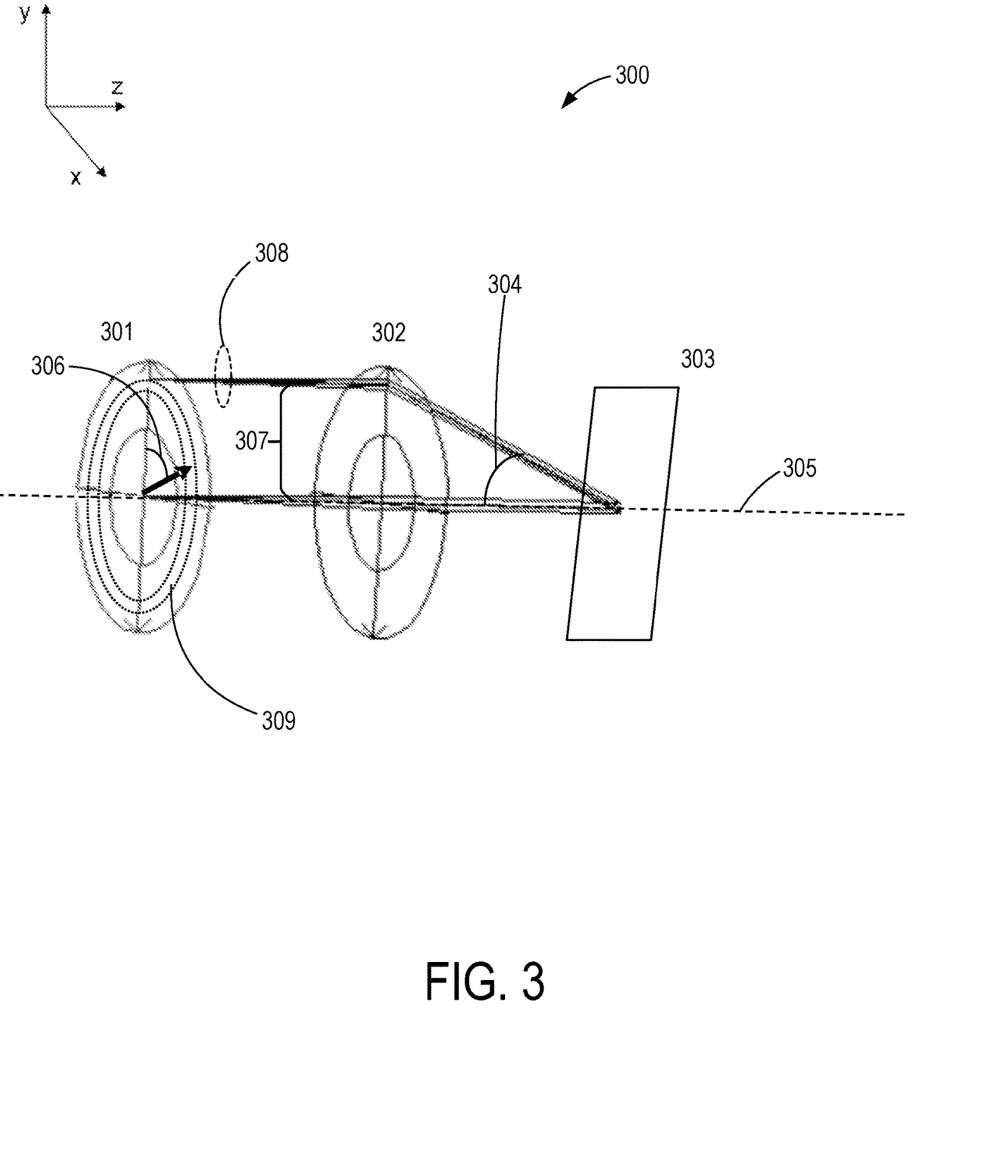
FIG. 3 is a perspective view of a ray tracing illustrating a relationship between an area of an objective entrance pupil and angle of incidence (AOI) of light illuminating a test sample.

With additional reference to FIG. 3 there is shown a detailed illumination diagram 300 of the test sample 220 where light source image at the plane 212 of system 200 corresponds to light image 301, an entrance of the objective lens 214 is entrance 302 and the surface of sample 220 is surface 303. For a light source image having a circular shape as shown, an angle of incidence (AOI) 304 to the sample surface 303 is defined by a radial distance of a light source image point from an optical axis 305 (normal to sample surface), e.g., a distance 307 between the optical axis 305 and outer ray set 308. An azimuth angle 306 of the rays in the light image 301 and the optical axis 305 forms a plane of incidence of the rays.

Referring again to FIG. 2, in representative examples, a polarization state generator such as a polarization mask 256 can be placed in position proximate plane 212 to provide a predetermined "pure" or approximately pure polarization state for each point of the light source image 212. Herein, "pure" polarization state means that each optical ray incident to the sample 220 is linearly polarized either in plane of incidence (p-polarized) or orthogonally to the plane of incidence (s-polarized) independently of azimuth angle. As result of pure polarization state, the rays from the sample 220 are also linearly polarized either p-polarized or s-polarized depending on the polarization of incident light ray, assuming no depolarization effects. As compared to alternative approaches where linearly polarized light coming to an objective pupil produces a polarization mix after reflection from the sample with s- and p-components (elliptically polarized light) depending on azimuthal angle 306 and optical properties of the test sample.

In some examples herein, the polarization mask 256 can be an S-waveplate or vortex waveplate. Examples of S-waveplates and vortex waveplates can convert linearly polarized light to radial polarized light with a polarization orientation (s- or p-) typically depending on orientation of the linear input light polarization. In some examples, to produce both "pure" polarization states within a single element, the linear polarization of half of the input beam aperture can be rotated 90 degrees, e.g., with half-wavelength plate. In some of such examples, half of the objective entrance pupil of objective 214, 216 can be radial p-polarized while another half of the objective entrance pupil is radial s-polarized, i.e., linearly polarized in the azimuthal direction. In further examples, the polarization mask 256 can be a micropolarizer array, e.g., an array of small individual polarizing cells which can be set according to a desired pattern.

Figure 4:
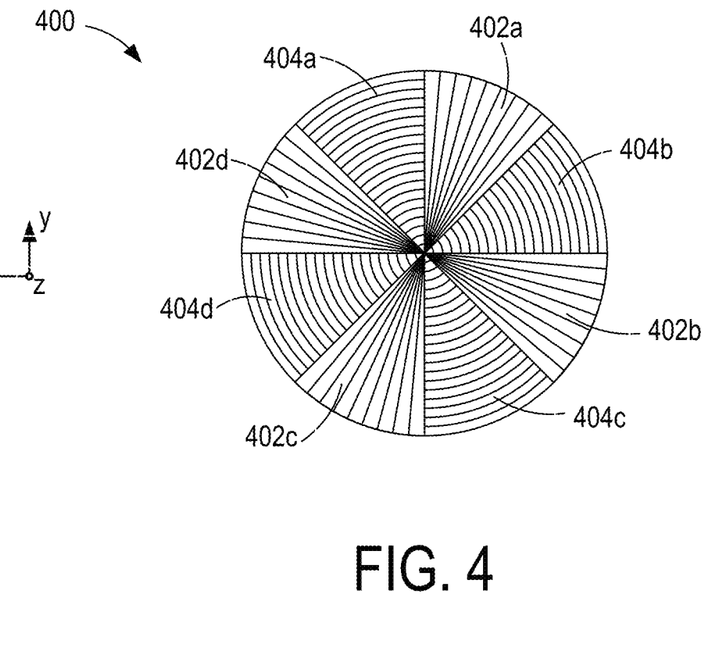
FIG. 4 is an end view of a polarization state produced by an example polarization mask that can be used at an entrance pupil.
Figure 5:
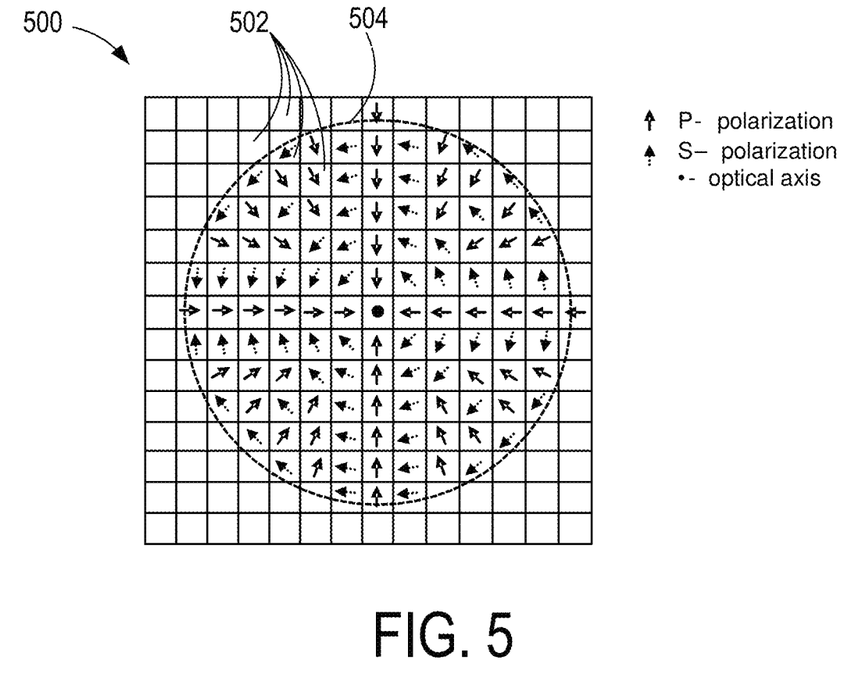
FIG. 5 is an end view of a polarization state produced by another example polarization mask in form of a micropolarizer array.

FIGS. 4-5 depict example polarization masks 400, 500 viewed in the direction of a propagating light, e.g., with illumination propagating into or out of the plane of the figures. Polarization mask 400 includes four regions 402a-402d configured to produce radially aligned linear p-polarization state for an input light beam linearly polarized along a predetermined axis. Four other regions 404a-404d are configured to produce azimuthally aligned linear s-polarization state (i.e., with the circumferential curvature shown not symbolic of a circular or elliptical polarization state but instead a linear polarization state aligned perpendicular to the radius at each azimuth) for the input light beam linearly polarized along the predetermined axis. As shown, the regions 402-404 forms an alternating pattern of evenly sized wedges, though it will be appreciated that numerous other configurations can be possible, including varying polarization state at different radial distances, e.g., such as rings or ring segments of selected s- or p-polarization state. In some examples, some or all of the regions can have a superposition of s- and p-polarization states. Polarization mask 500 is an example micropolarizer array which can be configured as a fixed polarization output or variable polarization output using a liquid crystal (LC) matrix. The micropolarizer array 500 includes a plurality of cells 502 with at least the cells in the area of illumination light aperture 504 being configured to produce an output illumination with either p- or s-polarization state with respect to a center position generally aligned with an optical axis of the illumination light.

Referring back to FIG. 2, the selectively polarized light source image 212 is reflected from test sample 220 and reference mirror 222, interferes on beamsplitter 218, re-imaged to plane 232, and subsequently split into the two channels 228, 230 and again re-imaged to planes 234, 236. In representative examples as shown, the spatial polarization distribution light source image at planes 234, 236 can be identical to the polarization distribution that was set with the polarization mask 256 because the test sample 220 and reference mirror 222 do not produce polarization components different than the polarization states of the incident light. Thus, optical filters 258, 260 can be placed at respective planes 234, 236 and configured to transmit only one of the p- or s-polarization components, e.g., by blocking or attenuating different regions, allowing measurement of the test sample image illuminated with either p- or s-polarized light. For example, optical filter 258 can be configured to transmits only spatial points corresponding to polarized light emitted from polarization mask 256 that are radial p-polarized and optical filter 260 can be configured to transmit only spatial points corresponding to polarized light emitted from polarization mask 256 that are radial s-polarized (or v.v.). The optical filters 258, 260 can be of various forms, such as obscuration masks that physically block light from the regions of the mask 256 belonging undesired polarization state, polarization masks similar to the mask 256 equipped with one or more additional polarization elements such as a linear polarizer, neutral density filters, etc.

With the optical filters 258, 260 configured to filter one of the polarization states, the microscope images of test sample 220 are produced with p-polarized light in one imaging channel, e.g., imaging channel 228 on area detector 248, and s-polarized light in another imaging channel, e.g., imaging channel 230 on area detector 250. With wavelength scanning (e.g., with WSI) changing the illumination wavelength of the beam 201 with tunable wavelength filter 208, a set of images can be collected on both detectors 248, 250 where each collected image corresponds to a predetermined wavelength. Effectively, the collected data can be a 3D array where X and Y coordinate corresponds to lateral position of the test sample 220 and Z represents the interferometry scan position (wavevector k). Analyzing a difference between interferograms obtained in p- and s-polarization can allow the extracting of material optical properties of the test sample 220 for each XY position within measured area of test sample 220.

For example, in simplified form the obtained interferograms can be described as:

$$I_{p,s}^{x,y}(k,\alpha) = C + A_{p,s}(k,\alpha) \cdot \text{Cos}(2 \cdot \pi \cdot k \cdot L + \phi_{p,s}(k,\alpha) + \varphi_{p,s}(k,\alpha)) \quad (1)$$

where x, y is the lateral coordinate of measured area of the test sample 220, A is modulation amplitude, L is optical path difference between the test sample 220 and reference mirror 222, k is wavevector (inverse to wavelength), α is angle of incidence (AOI) 304, ϕ is phase change upon reflection for p-, and s-polarizations, φ is phase change introduced by the measurement system for p-, and s-polarizations, and C is a dc offset to observed interferogram.

In some examples, to avoid mixing of different AOIs in collected interferograms, a spatial filter 262 can be positioned in front of the polarization mask 256 and can be configured to allow illumination of only selected regions corresponding to certain distance or distance range 309 from optical axis 305 of polarization mask 256, e.g., in the form of rings or ring segments. In such a configuration, the measured interferograms are composed of a narrow range of AOIs reflected from the test sample 220. Collecting multiple measurements with different distances 309 can provide set of interferograms with different AOI.

Processing the measured p- and s-interferograms obtained on detectors 248, 250 for each AOI using, for instance, Fourier transform can provide a set of parameters:

$$\text{magnitude } A_{p,s}^k = \sqrt{S_{p,s}^k R_{p,s}^k} \quad (2)$$

$$\text{and phase } \Phi_{p,s}^k = 2 \cdot \pi \cdot k \cdot L + \phi_{p,s}^k + \varphi_{p,s}^k \quad (3)$$

where index k corresponds to wavevector (inverse wavelength), and S and R represent reflection magnitude from test sample 220 and reference mirror 222, respectively. Repeating the analysis for each AOI and defining:

$$\Psi^{k,\alpha} = \frac{A_p^{k,\alpha}}{A_s^{k,\alpha}} \quad (4)$$

$$\Delta^{k,\alpha} = \Phi_p^{k,\alpha} - \Phi_s^{k,\alpha} = \phi_p^{k,\alpha} - \phi_s^{k,\alpha} + \delta \quad (5)$$

we obtain set of independent from optical path difference parameters that corresponds to a standard ellipsometric equation:

$$\frac{r_p}{r_s} = \frac{|r_p|}{|r_s|} \cdot e^{i(\phi_p - \phi_s)} = \tan(\Psi) \cdot e^{i\Delta} \quad (6)$$

where $r_p$ and $r_s$ are complex reflectivity of p- and s-polarization components, $\tan(\Psi)$ is amplitude ratio on reflection, and $\Delta$ is phase shift on reflection. Parameters $\delta = \varphi_p^{k,\alpha} - \varphi_s^{k,\alpha}$ and $R_{p,s}^{k,\alpha}$ represent system induced error which can be calibrated out by measurement of the test sample 220 with known optical properties.

By applying standard ellipsometry modeling techniques, e.g., as described above, the intrinsic structure of the test sample 220 (e.g., film thicknesses, optical dispersion N&K, etc) can be determined for each pixel of the area detectors 248, 250 that corresponds to a region within the measured test sample 220. After the optical properties of test sample 220 are established, the corresponding phase error can be inserted into eq. (1) above to evaluate a correct topographical description of the sample 220. Because multiple measurements corresponding to different AOIs and polarization states can be taken, the obtained value of OPD can be independently compensated for all AOIs and both polarization states, then averaged, to improve precision of the topography measurement.

In general, it is not necessary to obtain a set of interferograms corresponding different AOIs for ellipsometry processing. Instead, (e.g., without the spatial filter 262) interferograms having the averaged-over AOI can be collected and the ellipsometry model can take into account the AOI mix.

In some examples, another way to obtain angular resolved ellipsometric equations (4) and (5) can be achieved with an additional imaging channel or a modification to one of the imaging channels 228, 230 so that the additional or modified imaging channel is configured to provide an image of the objective pupil at plane 232 at the area detector of the imaging channel. For example, in a modification to imaging channel 228, the spatial filter 262 and polarization filter 258 can be removed and the detector 248 can be placed at the plane 234, e.g., with lens 252 absent and/or moving the detector around lens 252. The system 200 can then project pupil plane 232 of objective 214, 216 to area detector 248. In further examples, the pupil plane 234 can be reimaged to another conjugate plane, e.g., by moving the detector 248 to the left in FIG. 2 and inserting an additional relay lens in the beam path. In some examples, the detector 248 can remain in the same position and the optical relay configuration between lens 238, 240, 252 can be adjusted by moving, inserting, and/or removing optics to produce a pupil plane at the detector 248, e.g., by removing lens 240 and maintaining lens 252 in its position. In some example in which polarization states generated for the interferometer unit 202 include radially and azimuthally aligned polarization states in a common region (e.g., across the entire beam cross-section), light detected at a pupil plane of the imaging channel 228 can be filtered with a polarization filter, e.g., by converting the superposition of azimuthal and radial linearly polarized light into a superposition of orthogonally polarized light and filtering with a linear polarizer. In such examples, the detection would typically occur at a conjugate pupil plane after polarization filtering. In some examples, an aperture can be placed at plane 246 to select a region of interest on the test sample 220 for ellipsometric measurement. In this configuration, channel 228 provides ellipsometric information which can then be used to compensate PCOR error in the topography measurement obtained in channel 230.

Figure 6:
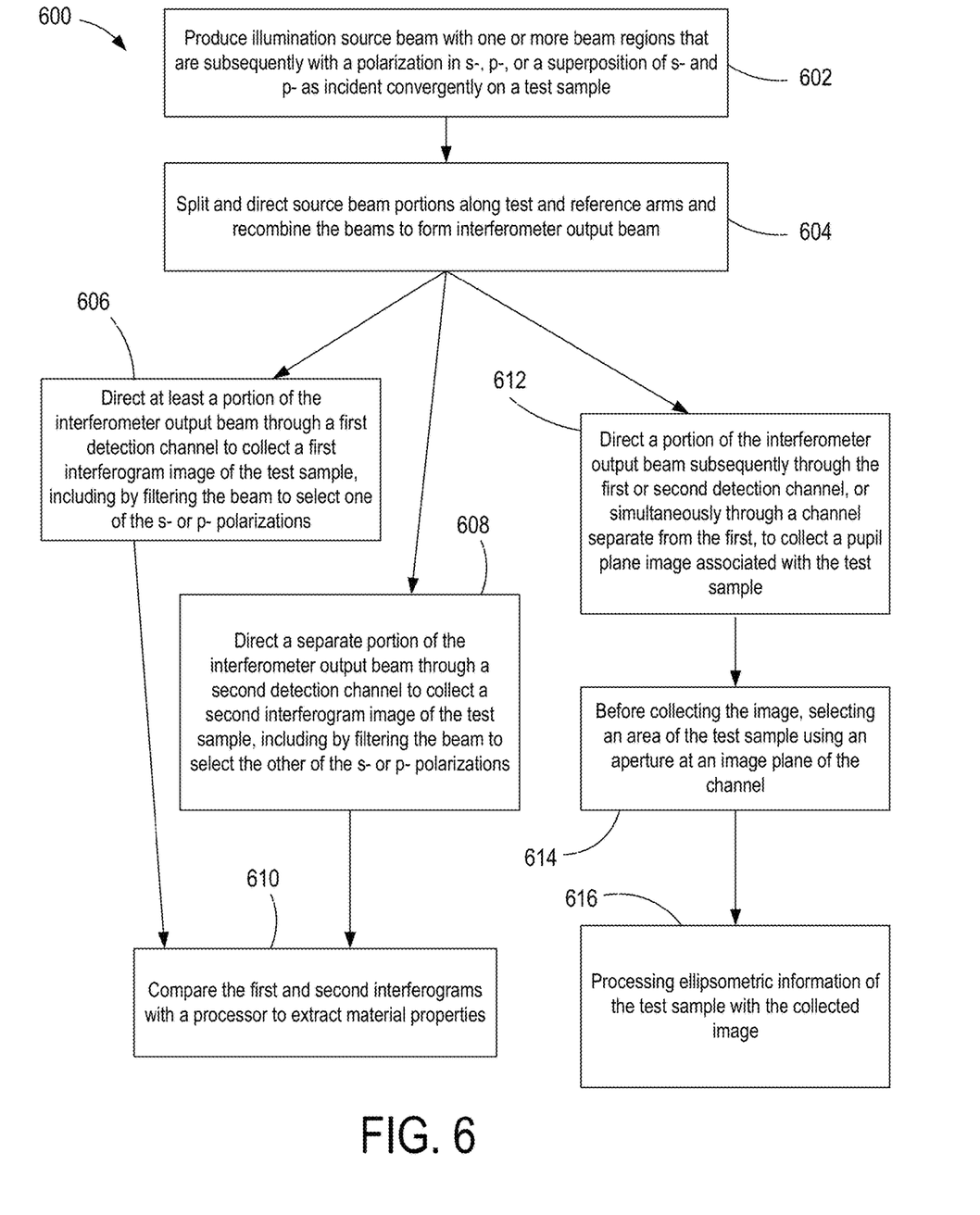
FIG. 6 is a flowchart of example methods of forming interferograms.

FIG. 6 shows various methods 600 of collecting interferometric and/or ellipsometric images of a test sample. At 602, an illumination source beam is produced so that it has one or more beam regions with linear polarizations or a superposition of linear polarization states such that the polarization is in a plane of incidence or perpendicular to the plane of incidence as subsequently incident convergently on a test sample. For example, a polarization state generator can be situated at a pupil plane of an interferometer objective, e.g., at a re-imaged plane of an illumination beam source. The polarization state generator can be configured to receive linear polarized light, e.g., by rotating and/or filtering the light emitted from the illumination beam source, and to change the polarization state in different regions of the cross-section of the beam such that the polarization state is linearly aligned radially with respect to an optical axis of the beam or is linearly aligned azimuthally with respect to the optical axis. In some examples, the light can be a superposition of perpendicular polarizations aligned radially and azimuthally. The illumination source beam can correspond to an interferometer source beam that is directed to an interferometer unit. At 604, the interferometer source beam is directed to the interferometer unit, in which the beam is split with beam portions directed along test and reference arms to respective test sample and reference surfaces, and recombined to form an interferometer output beam. In representative examples, a Linnik interferometer is used, but other interferometer configurations can be used as well.

At 606, at least a portion of the interferometer output beam is directed through a first detection channel to a detector so that a first interferogram image of the test sample can be collected. Before being received by the detector, the beam portion can be filtered, e.g., at another objective pupil plane by using a mask or set of polarization components configured to select one of the radially or azimuthally aligned linear polarization states. In some examples, the interferometer output beam can be split into multiple detection channels. For example, at 608, a separate portion of the interferometer output beam can be directed through a second detection channel to collect a second interferogram image of the test sample. Before being received by the detector of the second channel, the separate portion also can be filtered using a mask and/or polarizer to select the other of the radially or azimuthally aligned linear polarization states not selected by the first channel at 606. In this way, the two channels can simultaneously detect interferograms associated with the radially aligned or azimuthally aligned polarization states of the interferometer source beam. In some example, at 610, the two interferograms can be compared with a computer processor to extract material properties of the test sample.

In some examples, ellipsometric information about the test sample associated with a pupil plane can be collected for further ellipsometric analysis. For example, at 612, a portion of the interferometer output beam can be directed through first or second channel that is modified for pupil plane imaging, or through a separate channel that is configured to provide pupil plane imaging. For example, a lens relay objective and polarization filter can be removed and a pupil plane can be reimaged at the detector. In representative examples, at 614, a selected area of the sample can be selected for pupil plane imaging, e.g., by insertion of an aperture mask at a conjugate image plane of the test sample that is situated in the detection arm. At 616, ellipsometric information of test sample can be analyzed with a computer process based on the collected pupil plane image.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Example are described that produce beams of light having diameters or cross-sectional areas and beam divergences that can depend on beam wavelength and the optical systems used for beam shaping. Light generally comprises electromagnetic radiation at wavelengths between about 100 nm and 10 µm. Beam cross-sectional areas, diameters, or other beam dimensions can be described using boundaries that generally correspond to a zero intensity value, a lie value, a $1/e^2$ value, a full-width half-maximum (FWHM) value, or other suitable metric. Optical systems are described based on refractive lens objectives and relays and reflections at surfaces. Reflective lenses, such as mirrors and mirror relays can be used in some examples. Further examples can include transmission through samples and reference surfaces. Optical beams and optical elements are described in some examples with respect to one or more axes. Typically, an axis includes one or more straight line segments along which an optical beam propagates or along which one or more optical elements are situated. Such axes can be bent or folded with reflective surfaces, so that axes need not be single straight line segments. Various lenses are described or may be used, including convex-convex, planoconvex, concave-concave, planoconcave, cylindrical, fresnel, zone plates, holographic, spherical, aspheric, combinations thereof. Signals are also described and generally include variation over time of an electromagnetic wave. While disclosed examples show selected arrangements of pupil and image planes, and conjugate pupil and image planes, other arrangements or additional conjugate planes are possible.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

I claim:

1. An apparatus, comprising:
   a polarization state generator situated to provide an interferometer source beam with a region of polarized source light with a polarization state that is in-plane as subsequently incident on a sample and a region of polarized source light with a polarization state that is perpendicular to in-plane as subsequently incident on the sample;
   an interferometer unit configured to split the interferometer source beam into test and reference arm beams, to direct the test arm beam to the sample and the reference arm beam to a reference surface, and to recombine the test and reference arm beams to produce an interferometer output beam; and
   a detection unit configured to detect the interferometer output beam, wherein the detection unit includes a polarization filter situated at a detection pupil plane to receive at least a portion of the interferometer output beam and to attenuate one of the polarization states provided by the polarization state generator.

2. The apparatus of claim 1, wherein the polarization state generator is configured to provide (i) the region of polarized source light with the polarization state that is in-plane as subsequently incident on the sample as a region of radially aligned linear polarization state and (ii) the region of polarized source light with the polarization state that is perpendicular to in-plane as subsequently incident on the sample as a region of azimuthally aligned linear polarization state.

3. The apparatus of claim 2, wherein the polarization state generator comprises an S-waveplate or a vortex polarizer situated at a source beam pupil plane.

4. The apparatus of claim 3, wherein the polarization state generator comprises a linear polarizer configured to provide the interferometer source beam with a linear polarization state, a half-waveplate configured to rotate a portion of the linearly polarized interferometer source beam to provide beam portions that are linearly polarized and perpendicular to each other as incident to the S-waveplate or vortex polarizer.

5. The apparatus of claim 2, wherein the polarization state generator comprises a micropolarizer array comprising a plurality of polarizing cells.

6. The apparatus of claim 2, wherein the interferometer source beam comprises a ring or ring segmented beam spatially filtered or as generated from a beam source.

7. The apparatus of claim 1, further comprising an illumination light source configured to provide a source beam to the polarization state generator, wherein the illumination light source is further configured to vary a wavelength of the source beam to produce an optical path difference for wavelength scanning interferometry.

8. The apparatus of claim 1, wherein the interferometer unit comprises a movement stage configured to vary an optical path difference between the test and reference arms for displacement scanning interferometry.

9. The apparatus of claim 1, wherein the detection unit comprises:
   a beam splitter configured to split the interferometer output beam into first and second beam portions;
   a first detection arm including the polarization filter situated to receive the first beam portion and including a first detector situated to receive the filtered first beam portion; and
   a second detection arm including a second detector situated to detect the second beam portion.

10. The apparatus of claim 9, wherein the second detection arm includes a second polarization filter situated to receive the second beam portion at a second detection arm pupil plane, wherein the second polarization filter is configured to attenuate the other of the polarization states provided by the polarization state generator, wherein the second detector is situated to receive the second beam portion as a filtered second beam portion.

11. The apparatus of claim 10, wherein the first detector and second detector are situated at respective sample imaging planes to detect images of the sample.

12. The apparatus of claim 9, wherein the second arm comprises a field stop situated at a sample imaging plane and wherein the field stop is configured to limit a sample detection area at the second detector, wherein the second detector is situated at a pupil plane of the second arm to detect the second beam portion.

13. The apparatus of claim 12, wherein the first detector and second detector are configured to simultaneously detect imaging information and ellipsometric pupil information, respectively.

14. The apparatus of claim 1, further comprising a processor and memory, wherein the memory is configured with processor-executable instructions that cause the processor to compare first and second interferogram images to determine material properties of the sample and/or determine ellipsometric information of the sample from one or more collected pupil plane images.

15. The apparatus of claim 1, wherein the region of polarized source light with a polarization state that is in-plane as subsequently incident on a sample and the region of polarized source light with a polarization state that is perpendicular to in-plane as subsequently incident on the sample form a common region having a superposition of two orthogonal linear polarizations.

16. The apparatus of claim 1, wherein the interferometer unit comprises a Linnik, Michelson, and/or Mach-Zehnder interferometer configured to produce an interferometer output beam.

17. A method, comprising:
   using a polarization state generator, producing an interferometer source beam with a region of polarized source light with a polarization state that is in-plane as subsequently incident on a sample and a region of polarized source light with a polarization state that is perpendicular to in-plane as subsequently incident on the sample;
   using an interferometer unit, splitting the interferometer source beam into test and reference arm beams, directing the test arm beam to the sample and the reference arm beam to a reference surface, and recombining the test and reference arm beams to produce an interferometer output beam;
   directing at least a portion of the interferometer output beam through a first detection channel to collect a first interferogram image of the test sample, including by filtering the portion of the beam to select one of the polarization states produced for the interferometer source beam; and
   directing a separate portion of the interferometer output beam through a second detection channel to collect a second interferogram image of the test sample, including by filtering the portion of the beam to select the other of the polarization states produced for the interferometer source beam.

18. The method of claim 17, further comprising comparing the first and second interferogram images with a processor to determine material properties of the test sample.

19. The method of claim 17, further comprising directing a portion of the interferometer output beam through a detection channel to collect a pupil plane image associated with the test sample.

20. The method of claim 19, further comprising, with a processor, determining ellipsometric information of the test sample from the collected pupil plane image.

21. An apparatus, comprising:
   a polarization state generator situated to provide an interferometer source beam with a region of polarized source light with a polarization state that is in-plane as subsequently incident on a sample and a region of polarized source light with a polarization state that is perpendicular to in-plane as subsequently incident on the sample; and
   an interferometer unit configured to split the interferometer source beam into test and reference arm beams, to direct the test arm beam to the sample and the reference arm beam to a reference surface, and to recombine the test and reference arm beams to produce an interferometer output beam;
   wherein the polarization state generator is configured to provide (i) the region of polarized source light with the polarization state that is in-plane as subsequently incident on the sample as a region of radially aligned linear polarization state and (ii) the region of polarized source light with the polarization state that is perpendicular to in-plane as subsequently incident on the sample as a region of azimuthally aligned linear polarization state;
   wherein the polarization state generator comprises an S-waveplate or a vortex polarizer situated at a source beam pupil plane.

22. An apparatus, comprising:
   a polarization state generator situated to provide an interferometer source beam with a region of polarized source light with a polarization state that is in-plane as subsequently incident on a sample and a region of polarized source light with a polarization state that is perpendicular to in-plane as subsequently incident on the sample; and
   an interferometer unit configured to split the interferometer source beam into test and reference arm beams, to direct the test arm beam to the sample and the reference arm beam to a reference surface, and to recombine the test and reference arm beams to produce an interferometer output beam;
   wherein the polarization state generator is configured to provide (i) the region of polarized source light with the polarization state that is in-plane as subsequently incident on the sample as a region of radially aligned linear polarization state and (ii) the region of polarized source light with the polarization state that is perpendicular to in-plane as subsequently incident on the sample as a region of azimuthally aligned linear polarization state;
   wherein the polarization state generator comprises a micropolarizer array comprising a plurality of polarizing cells.

* * * * *